US006916017B2

(12) United States Patent
Noe

(10) Patent No.: US 6,916,017 B2
(45) Date of Patent: Jul. 12, 2005

(54) VIBRATION DAMPER DEVICE

(75) Inventor: Mathieu Noe, Barbison (FR)

(73) Assignee: Hutchinson, Paris (FR)

( * ) Notice: Subject to any disclaimer, the term of this patent is extended or adjusted under 35 U.S.C. 154(b) by 164 days.

(21) Appl. No.: 10/332,940

(22) PCT Filed: Jun. 6, 2002

(86) PCT No.: PCT/FR02/01926
§ 371 (c)(1),
(2), (4) Date: Jan. 14, 2003

(87) PCT Pub. No.: WO02/099306

PCT Pub. Date: Dec. 12, 2002

(65) Prior Publication Data
US 2004/0041315 A1 Mar. 4, 2004

(30) Foreign Application Priority Data
Jun. 6, 2001 (FR) .............................. 01 07353

(51) Int. Cl.$^7$ ........................................... F16F 15/073
(52) U.S. Cl. ...................... 267/161; 188/267; 267/136
(58) Field of Search ................................ 267/158, 161, 267/162, 136; 188/267

(56) References Cited

U.S. PATENT DOCUMENTS

| 2,690,529 A | * | 9/1954 | Lindblad | 335/228 |
| 5,361,243 A | * | 11/1994 | Kasahara | 369/44.15 |
| 5,673,785 A | * | 10/1997 | Schlaak et al. | 200/245 |
| 5,709,516 A | | 1/1998 | Peterson et al. | |
| 6,056,519 A | * | 5/2000 | Morita et al. | 417/415 |

FOREIGN PATENT DOCUMENTS

| DE | 21 00 831 A | 7/1972 |
| DE | 198 23 716 A | 12/1999 |
| FR | 2 454 020 A | 11/1980 |

* cited by examiner

Primary Examiner—Matthew C. Graham
(74) Attorney, Agent, or Firm—Alston & Bird LLP

(57) ABSTRACT

The invention relates to a damper device for damping vibration, the device comprising an energy converter device mounted on a baseplate for fixing to a structure, the energy converter device presenting a moving portion suspended by at least one spring. The moving portion presents at least one flat centering spring extending between an inside region having a first diameter and an outside region having a second diameter, said centering spring presenting at least two cutouts, each being in the form of a branch having at least one segment turning its concave side towards the outside of the spring.

11 Claims, 2 Drawing Sheets

VIBRATION DAMPER DEVICE

The present invention relates to a vibration damper device.

BACKGROUND OF THE INVENTION

Dynamic beaters are used in industry to prevent vibration propagating in a given structure.

They are based essentially on mass-spring systems.

In certain applications, and in particular in aviation, and more particularly with helicopters, it is desirable for the performance of such beaters to be capable of being adapted as a function of various flight configurations, with this being done by means of a control that makes the characteristics of the beater as independent as possible of pressure, temperature, and/or humidity conditions.

OBJECTS AND SUMMARY OF THE INVENTION

In a first aspect, the invention seeks to solve this problem on the basis of the idea of implementing an electrodynamic motor that is used to vary damping.

The invention thus provides a damper device for damping vibration comprising a converter device for converting mechanical energy into electrical energy that is mounted on a baseplate for fixing to a structure to be damped, wherein said converter device comprises an electrodynamic motor having a coil mechanically connected to the baseplate and a magnetic circuit suspended by at least one spring, wherein the coil is coupled to an electrical load presenting a resistive component, and wherein the damper device presents a control device for causing the resistance of said resistive component to vary with at least two values.

The first control value may correspond to a first amount of damping (e.g. leaving the coil open circuit), and the second control value may correspond to a greater amount of damping (e.g. short circuiting the coil).

The invention also provides the use of a damper device in an aircraft, in particular in a helicopter, the damper device using a flight computer to cause the control device to take up the first control value when the aircraft is in steady flight and the second control value when the aircraft is in a heading-changing state.

The use of dynamic beaters also raises the problem of operating in a direction corresponding to the axis of symmetry of the system.

The problem posed is thus the need to guarantee that motion takes place along this axis only in order to avoid drawbacks such as vibration, interference, friction, or even destruction of the coil.

In a second aspect, the invention seeks to solve this problem, based on the idea of implementing one or more appropriate centering springs.

In a second aspect, the invention provides a damper device for damping vibration, the device comprising an energy converter device mounted on a baseplate for fixing to a structure, the energy converter device presenting a moving portion suspended by at least one spring, wherein the moving portion presents at least one flat centering spring extending between an inside region having a first diameter and an outside region having a second diameter, said centering spring presenting at least two cutouts, each being in the form of a branch having at least one segment turning its concave side towards the outside of the spring.

At least one cutout may be spiral-shaped, at least in part, for example being in the form of a parabolic spiral.

At least one cutout may present an outer segment that is straight.

Each cutout advantageously makes one to one-and-a-half turns around the perimeter of the spring.

There may be three cutouts, and preferably there are four, in which case each cutout preferably extends over substantially one turn around the perimeter of the spring.

It is particularly advantageous for a centering spring to be constituted by a stack of flat springs, in particular to form a laminated structure. The axial stiffness and the maximum stress reached reduces with increasing number of stacked layers, thus making it possible in particular to adapt the ratio of the axial stiffness over the radial stiffness of the centering spring. In addition, the maximum stress reached decreases with increasing thickness of each layer.

BRIEF DESCRIPTION OF THE DRAWINGS

Other characteristics and advantages of the invention appear better on reading the following description, given by way of non-limiting example, and with reference to the accompanying drawings, in which.

MORE DETAILED DESCRIPTION

Figure 1:
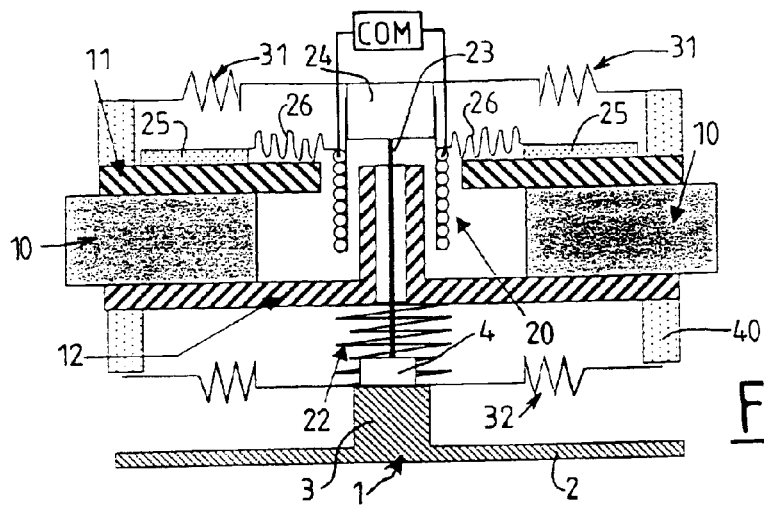
FIG. 1 is a diagrammatic section view of a device of the invention.
Figure 2A:
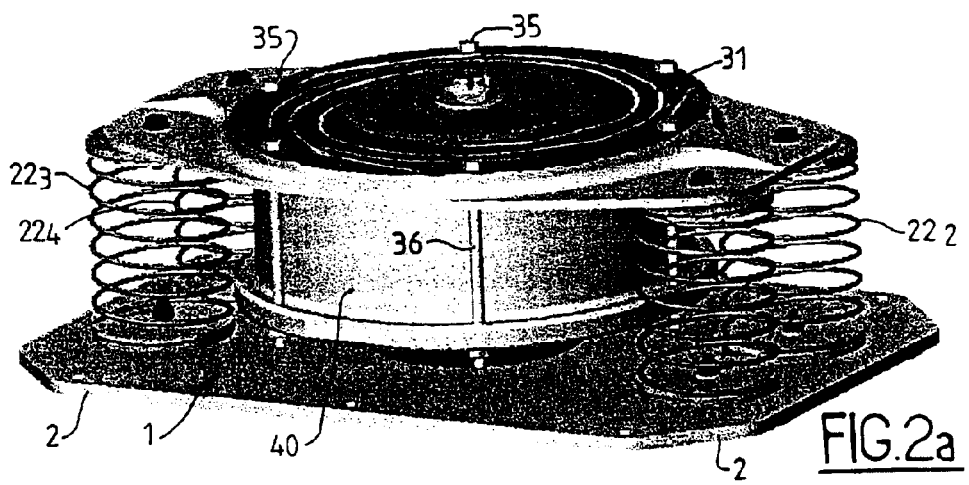
FIGS. 2a and 2b are respectively a perspective view and a section view of a device constituting a preferred embodiment of the invention.
Figure 2B:
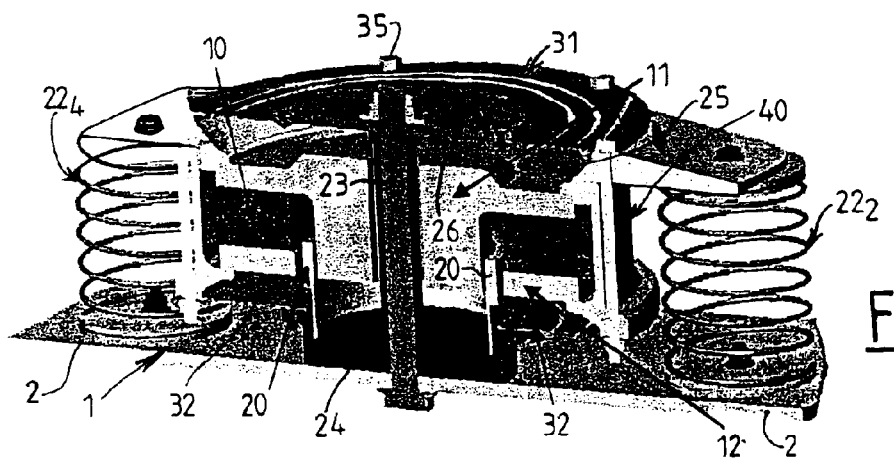

The beater shown in FIG. 1 presents a baseplate 1 including a plane plate 2 for securing to a structure that is to be damped. A coil 20 is secured to the baseplate 1. For this purpose, a rod 23 carries two flanges 3 and 24 at opposite ends, one of the flanges 3 being secured to the baseplate 1 and the other flange 24 carrying the coil 20. The moving portion which comprises a top pole piece 11, a bottom pole piece 12, and a magnet 10 is mounted on a spring 22 and is centered by two centering springs comprising a top spring 31 and a bottom spring 32 mounted on a housing or "salad bowl" 40.

It should be observed that sealing is provided at the coil 20 by corrugated fabric 26 carried by a flat ring 25 mounted on the pole piece 11.

The assembly defines an electrodynamic motor whose coil is stationary relative to the baseplate 1 and whose moving portion is a mass $M_b$ constituted essentially by the magnetic circuit, i.e. by the pole pieces 11 and 12 and the magnet 10.

A control circuit serves to vary the value of a resistive load connected to the terminals of the coil 20. It may be constituted by a variable resistor, e.g. a varistor, whose resistance is a function of a voltage, or it may be a rheostat controlled by the control device. This makes it possible to vary damping between two extremes, namely a very low level of damping with the coil 20 being left in open circuit, or maximum damping by short circuiting the coil 20, with the load resistance then being equal to the intrinsic resistive component $R_0$ of the coil 20.

It is possible to select a load of large resistance $R_1$ for a relatively low first level of damping, and a smaller resistance $R_2$ for a higher level of damping.

Relatively low or minimal damping is particularly suitable for an aircraft in steady flight, where vibration is under steady conditions, thereby causing the beater to be maximally effective, whereas a higher level of damping may be selected when changing heading in order to avoid transients that might destabilize the beater and/or cause the level of vibration in the cabin to increase.

While the beater is in operation, relative motion takes place between the magnetic circuit of mass $M_b$ and the baseplate 1. The coil 20 thus acts as a generator of electromagnetic force $E_b$=BL.v where BL designates the force factor of the electrodynamic motor (in Newtons per amp (N/A)), and where v designates the relative velocity between the magnetic circuit of mass $M_b$ and the baseplate 1.

The coil 20 of impedance $Z_b$ is connected to a load referenced $Z_c$. A force $F_a$ is established between the coil and the circuit of mass $M_b$ opposing the velocity v (in application of Lenz law) and is given by the following expression:

$$F_a = \frac{(BL)^2}{Z_b + Z_c} v \quad (1)$$

This constitutes an expression for a damping force.

If it is assumed that the load is constituted by a rheostat (of adjustable resistance), then the damping coefficient $C_b$ ($C_b$=$F_a$/v) can be varied between two extreme values.

To obtain maximum $C_b$:

it is necessary to select an electrodynamic motor whose characteristics enable the ratio $(BL)^2/Z_b$ to be maximized; and $Z_c$ must be minimized ($Z_c$=0 constituting a dead short circuit).

To obtain minimum $C_b$:

it suffices to open the electrical circuit ($Z_c$=∞).

The frequency to which the beater is tuned is given by its moving mass and the set of stiffnesses connecting said mass to the baseplate:

1) Total stiffness of the centering springs 31 and 32: Ks.
2) Total stiffness of the return spring(s) 22: Kr.

This gives the relationship:

$$M_b(2\pi F_b)^2 = Ks + Kr \quad (2)$$

To allocate stiffness between the return springs and the centering springs 31 and 32, we take the following 35 constraints into consideration:

1) The centering springs 31 and 32 are not stressed when the mass $M_b$ is subjected to gravitational force alone.

2) The sum Ks+Kr is fixed in order to satisfy equation (2).

Constraint No. 1 means that the static weight of the moving mass $M_b$ must be carried by the spring(s) 22. The unloaded length thereof is therefore determined so as to take account of this static loading, which is in addition to the dynamic motion: the lower the stiffness Kr the longer the unloaded length needs to be. Kr must therefore be selected to be high enough to avoid leading to certain difficulties in integration (overall size, springs bottoming, turns touching).

In practice, it is not possible to cause Ks to tend towards a value that is arbitrarily small, for the reasons given below.

The beater described operates in a single direction which is along the axis of symmetry of the system (vertical axis Z in FIG. 1, passing through the center of the device).

It is appropriate to guarantee that relative motion between the magnetic circuit $M_b$ and the baseplate 1 along this axis avoids any risk of the coil 20 being destroyed mechanically.

The following are therefore excluded, a priori:

radial displacements (in directions X and Y perpendicular to the direction Z); and turning about the axes X and Y.

To guarantee this function, the mass $M_b$ is guided by two springs 31 and 32 placed on either side of the circuit of mass $M_b$. Their centers are secured to a pin 23 which is in turn secured to the baseplate 1, and their peripheries are secured to the circuit of mass $M_b$.

Amongst other guidance techniques that could alternatively have been used, we mention:

1) Ball bushings: this solution is more expensive, requiring a rectified shaft. In addition, drive friction characteristics are non-linear and vary over time (due to wear of contact zones), thereby modifying the behavior of the beater during its life cycle. It would also be necessary to add a system for preventing the mass $M_b$ turning about the axis Z.

2) Polymer bearings: this solution also requires a rectified shaft. In addition, drive friction characteristics are non-linear and vary over time (due to wear of contact zones), thereby modifying the behavior of the beater during its life cycle. It would also be necessary to add a system for preventing the mass $M_b$ turning about the axis Z.

Figure 3:
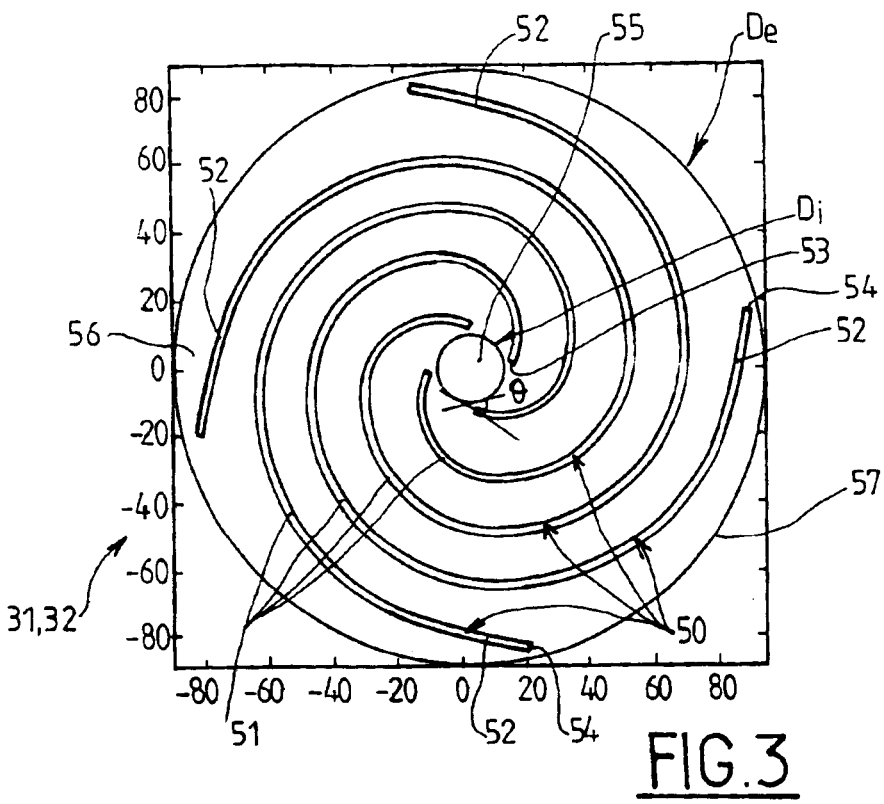
FIG. 3 shows an embodiment of a three-branch centering spring or "spider"

FIG. 3 shows a centering spring 31, 32 made of metal presenting four cutouts 50 (or through slots) forming four branches that are regularly distributed at 90° intervals around the perimeter of an opening 55, and which extend from respective inside ends 53 close to the central opening 55 of diameter $D_i$ to respective outside ends 54 close to the outline 57 of diameter $D_e$. These cutouts 50 are of rounded profile, being convex towards the outside of the spring, and in particular they are of spiral shape, preferably in the form of a parabolic spiral.

Towards their ends 54, the cutouts 50 preferably present respective linear segments 52 serving to avoid stress concentrations as explained below. In the example shown, the branches 50 occupy slightly more than one turn around the perimeter of the spring between their ends 53 and 54.

Figure 4:
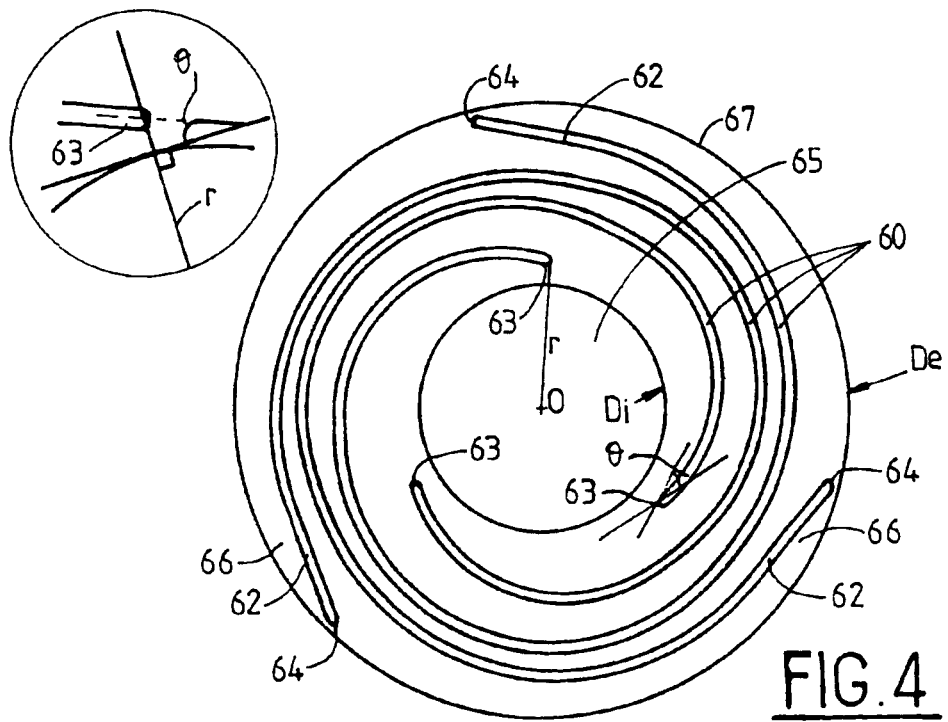
FIG. 4 shows an embodiment of a four-branch centering spring or "spider".

FIG. 4 shows a three-branch embodiment in which the inside ends 63 are distributed at 120° around the periphery of a central opening of diameter $D_i$ and which extend to outside ends 64 close to the outline 67 of diameter $D_e$. As in the preceding case, they are advantageously of spiral-shaped profile, preferably in the form of a parabolic spiral. They extend over slightly-more than one turn of the spring. Each advantageously has a linear end segment 62 in order to avoid stress concentrations.

The ends 53, 54, 63, 64 are spaced apart from the openings 55, 65 and from the outlines 57, 67, respectively to ensure that the spring can be fitted properly without stresses concentrating at said ends.

It is particularly advantageous to make the springs 31, 32 in the form of a stack of springs, e.g. in the form of a laminated structure, i.e. a stack of individual springs secured to one another, e.g. by adhesive. This makes it possible to modify axial stiffness which decreases with increasing number of layers, and also to modify the maximum stress that is reached.

This makes it possible in particular to adjust the ratio of axial stiffness to radial stiffness.

The centering springs 31 and 32 provide the following advantages:

1) No contact between moving parts: no non-linearity is introduced, no parasitic friction.

2) Ease of fabrication.

The centering springs 31 and 32 are advantageously made so as to comply with a certain number of constraints:

1) Axial stiffness (along the axis Z): it must be less than a maximum value $Kz=M_b(2\pi F_b)^2$.

2) Radial stiffness (in the X,Y plane) in any radial direction: it must be great enough to prevent the radial forces applied to the beater leading to relative radial displacement between the coil and the magnetic circuit due to the springs buckling which could lead to the coil being damaged. This characteristic must also be maintained regardless of the position of the moving mass along the axis Z. It is therefore necessary to avoid spring designs that might be subject to buckling at maximum excursion of the moving mass. Using centering springs having cutouts that form branches that are concave towards the outside makes it possible to avoid buckling.

3) The ratio of radial size to spring displacement should be as small as possible.

4) The maximum stresses in the spring material should be such as to enable the part to perform a very large number of cycles (>$10^8$ cycles). The maximum stress state is obtained for peak displacements.

The preferred embodiment implements cutouts in the form of parabolic spirals (or following one or more circular arcs approximating the profile of a parabolic spiral).

Design parameters are as follows:

1) The number of branches (at least two, preferably four).
2) Inside and outside diameters $D_i$ and $D_e$.
3) Spring stiffness.
4) Start angle $\theta$ of the cutout (at its inside diameter end, see detail in FIG. 4). The closer $\theta$ is to 90°, the more progressively stress varies. When $\theta$ is close to zero, stress varies suddenly in the end zone.
5) Terminating the cutout (on the outside end): termination takes place progressively over a section of material 56, 66 which flares in practically triangular manner, thus avoiding local concentrations of stress on small radii of curvature. For this purpose, it is possible to give the branches linear terminal profiles 52, 62.

What is claimed is:

1. A damper device for damping vibrations, the device comprising an energy converter device mounted on a baseplate for fixing to a structure, the energy converter device presenting a non-moving portion comprised of a coil, a rod and of said baseplate, and a moving portion that is moveable in a longitudinal direction and presents two pole pieces and a magnet and is suspended by at least one return spring, wherein the moving portion presents, on opposite longitudinal ends, flat centering springs extending between an inside region that has a first diameter and that is fixed to the non-moving portion and an outside region that has a second diameter and that is fixed to a respective longitudinal end of the moving portion, said centering spring presenting at least two cutouts, each being in the form of a branch having at least one segment turning its concave side towards the outside of the spring.

2. A device according to claim 1, wherein at least one cutout is spiral-shaped, at least in part.

3. A device according to claim 2, wherein at least one segment is a portion of a parabolic spiral.

4. A device according to claim 1, wherein at least one cutout presents an outer segment that is straight.

5. A device according to claim 1, wherein each cutout makes 1 to 1.5 turns around the perimeter of the centering spring.

6. A device according to claim 1, wherein the centering spring has three cutouts.

7. A device according to claim 1, wherein the centering spring has four cutouts.

8. A device according to claim 7, wherein each cutout extends over substantially one turn of the periphery of the centering spring.

9. A device according to claim 1, wherein the centering spring is constituted by a stack of individual flat springs.

10. A device according to claim 7, wherein the stack of flat springs constitutes a laminated structure.

11. A device according to claim 1, wherein the outside region of at least one of the centering springs is fixed to a longitudinal end of a housing of the moving portion.

* * * * *